Patented June 26, 1945

2,379,247

UNITED STATES PATENT OFFICE 2,379,247

METHOD OF PREPARING SHAPED SHEETS OF HARD POLYMER

Irving E. Muskat, Akron, Ohio, assignor to Pittsburgh Plate Glass Company, Pittsburgh, Pa., a corporation of Pennsylvania No Drawing. Application May 28, 1942,
Serial No. 444,925

8 Claims. (Cl. 18—47.5)

This invention relates to the polymerization of unsaturated alcohol esters of polyacids. In the polymerization of these materials it is often desirable to secure cast polymerized products of various shapes. While shaped products may be produced directly by casting methods, this is often objectionable in view of the large number of molds required for production of a variety of shaped articles.

In accordance with the present invention, it has been found that shaped products may be secured by shaping the polymerized products which possess substantial rigidity at an elevated temperature preponderantly by elastic deformation and without substantially exceeding the elastic limit of the material. These shaped products when held in a mold or other mechanism capable of retaining the shape imparted to the polymer and cooled to room temperature retain this new shape. Prior to the present invention, shaping of these highly cured polymers was regarded as an impossibility due to their comparative infusibility.

The polymerization of the materials herein contemplated appears to proceed through a plurality of stages. As the polymerization is first initiated, the monomer thickens to a viscous syrup which is probably a solution of a fusible polymer dissolved or dispersed in the monomer. This fusible polymer is generally soluble in many organic solvents. As polymerization proceeds further, a solid or semi-solid gel is formed. The character of the gel depends largely upon the degree to which it has been polymerized. At least a portion of this gel is found to be substantially insoluble in the common organic solvents such as xylene or acetone and merely swells or remains unaffected when pulverized and extracted with solvents such as acetone, benzene, xylene, toluene, etc. Generally the polymer in the gel comprises a mixture of soluble and insoluble constituents and the two may be separated by extraction with solvents. In most cases the quantity of insoluble material in the gel is large, often being about 20 to 90 percent by weight of the total mixture.

Many of these gels of lower acetone insolubility (20 to 75 percent) do not possess substantial rigidity and generally a flat sheet thereof may be bent or curved to a substantial degree without fracture. For example, ethylene glycol bis (methallyl carbonate) may be polymerized to form a polymer sheet ⅛ of an inch in thickness, 12 inches long, and 2 inches wide and containing about 50 percent of insoluble matter which may be lapped upon itself to form a cylindrical section. Gels of high insolubility, however, often possess considerable stiffness and are not sufficiently flexible to permit their being bent in this manner. This may be particularly true of thick sections thereof. Many of these gels having a lower content of acetone insoluble polymer are comparatively weak and tear or crumble easily.

These polymerization products of high soluble content may be further polymerized and as polymerization proceeds, the concentration of insoluble matter therein as well as the strength and rigidity of the polymer increases until a hard, tougher polymer which is considerably less brittle than glass and more resistant to shattering is formed. Such polymers have high tensile strength and elasticity and have many of the properties characteristic of other organic glasses. Generally, these products possess substantial rigidity and bend only under comparatively high loads. Usually the polymers of high insoluble content are "form stable" and resist deformation to a considerable degree. They are highly elastic and when a deforming or bending load impressed upon such polymers is released, the polymers spring back immediately or within a few seconds to their original shape. These polymers contain a high concentration, generally in excess of 90 percent, of insoluble material which is not soluble in the solvents capable of dissolving the soluble polymer. Very often, however, they are not completely insoluble and contain 1 to 5 percent or more of a soluble component which may be extracted by a solvent such as acetone, xylene, etc. These tough polymers are not thermoplastic although they may be shaped at an elevated temperature to a limited degree, without fracture, when subjected to a deforming pressure. Thus, it has been found that when these comparatively rigid polymers are heated to a temperature of 50° C. or above, preferably below 175° C., sheets of the polymer may be curved or otherwise bent or shaped to a limited extent and upon cooling the polymers in their bent or curved form they retain the general contour imparted to them. However, if the deforming pressure is released while the polymer is still hot, it returns very quickly to its original shape.

In this respect it is quite different from the thermoplastic polymers which have been previously subjected to forming operations. Thus, it is known that thermoplastic polymers such as polymerized methyl methacrylate may be heated and bent to a suitable curvature. In such a case, however, they return but slowly to their original shape when the deforming load is released and generally do not completely return, the deformation creating a permanent set.

If the deformation of a thermoplastic polymer, such as polymerized methyl methacrylate, is observed as a deforming load is applied and released, it is found that during application of the load the polymer is both "elastically" and "plastically" deformed. As shown in an article by Gordon W. Kline, entitled "Creep and cold flow of plastics," Modern Plastics, October, 1941, page 75, upon release of the load the polymer recovers or springs back a portion of the deformation immediately or within 30 to 60 seconds. Such immediate recovery is due largely to the elasticity of the polymer and the recovery is largely "elastic" recovery which is the recovery from "elastic deformation." Thereafter, the polymer will continue to recover at a slower rate over a period of several minutes or even several hours. Such slow recovery may be designated as "plastic recovery" and is the recovery from plastic deformation.

In the usual processes of shaping polymerized methyl methacrylate involving the steps of heating the polymer and shaping it, the deformation is mainly plastic deformation and the plastic is generally permanently deformed to some degree. In contrast, when the polymers of the unsaturated alcohol polyesters herein contemplated are heated to above 50° C. and are shaped as herein described, the deformation is substantially wholly elastic deformation which is completely and almost instantaneously recovered if the load on the heated polymer is released before cooling. However, in accordance with the present invention, it is found a major portion of this elastic deformation is retained if the polymer is cooled below 35° C. before the load is released.

The following tests indicate the characteristic difference between the polymer herein contemplated and a commercial methyl methacrylate polymer. In these tests, test strips ½ x ½ x 5 inches of cast polymerized methyl methacrylate and cast polymerized diethylene glycol bis (allyl carbonate) polymerized at 70° C. until it possessed a hardness of 14 Knoop. Each of these test pieces was supported on edge upon steel blocks 4 inches apart and a 5.5 pound load applied to the specimen midway between the blocks. The temperature of the sample was constantly increased at a rate of 0.5 degree per minute and the deflection measured. The following results were secured:

| Elapsed time minutes | Methyl methacrylate | | Diethylene glycol bis (allyl carbonate) | | |
|---|---|---|---|---|---|
| | Deflection, inches | Temp., °C. | Time, minutes | Deflection, inches | Temp., °C. |
| 0 | 0 | 50 | 0 | 0 | 35 |
| 10 | 0.0007 | 55 | 8 | 0.0012 | 40 |
| 22 | 0.0033 | 60 | 1.8 | 0.0070 | 45 |
| 34 | 0.0169 | 65 | 28 | 0.0159 | 50 |
| 42 | 0.0545 | 68.2 | 40 | 0.0272 | 55 |
| | | | 50 | 0.0384 | 60 |
| 46 | 0.0965 | 69.9 | 62 | 0.0474 | 65 |
| | | | 76 | 0.0540 | 70 |
| 50 | 0.1650 | 71.5 | 86 | 0.0567 | 75 |
| | | | 96 | 0.0637 | 80 |
| 54 | 0.3160 | 73.1 | 110 | 0.0637 | 85 |
| | | | 126 | 0.0637 | 90 |
| 58 | 0.4610 | 74.9 | 138 | 0.0637 | 95 |
| | | | 150 | 0.0637 | 100 |
| | | | 162 | 0.0637 | 105 |
| | | | 170 | 0.0637 | 110 |
| | | | 180 | 0.0637 | 115 |
| | | | 192 | 0.0637 | 120 |
| | | | 206 | 0.0637 | 125 |
| | | | 222 | 0.0637 | 130 |

Note that whereas polymeric methyl methacrylate was deformed to an increasing degree as the temperature increased, the deformation of polymeric glycol bis (allyl carbonate) reached a maximum and thereafter did not increase as the temperature increased.

The following tables illustrate a further test showing the difference in the type of deformation resulting upon loading samples of cast polymerized methyl methacrylate and diethylene glycol bis allyl carbonate, having the dimensions ½ x ¼ x 5 inches. In this test the samples were supported on edge upon steel blocks 4 inches apart and a load of 1210 grams applied to the specimens midway between the blocks. Thereafter, the specimens were heated to the indicated temperature and deflections measured. The load was then removed while holding the temperature constant and the deflection was again measured. The following tables illustrate the results obtained.

*Polymerized methyl methacrylate*

| Time minutes elapsed | Temperature, °C. | Load, grams | Deflection, mils |
|---|---|---|---|
| 72 | 60 | 1210 | 4.1 |
| 90 | 70 | 1210 | 13.5 |
| 100 | 75 | 1210 | 29.7 |
| 106 | 77 | 1210 | 50.0 |
| 106 | 77 | 1147 | 51.5 |
| 107 | 77 | 830 | 50.3 |
| 108 | 77 | 512 | 49.2 |
| 111 | 77 | 195 | 47.2 |
| 117 | 77 | 195 | 45.4 |

This sample was deformed considerably after the load was removed and the sample removed from the blocks.

*Diethylene glycol bis-allyl carbonate*

| Time, minutes | Temperature, °C. | Load, grams | Deflection, mils. |
|---|---|---|---|
| 0 | 25 | 1,150 | 8.2 |
| 34 | 40 | 1,150 | 9.3 |
| 54 | 50 | 1,150 | 16.2 |
| 78 | 62 | 1,150 | 31.0 |
| 94 | 70 | 1,150 | 42.8 |
| 112 | 80 | 1,150 | 54.1 |
| 132 | 90 | 1,150 | 61.1 |
| 152 | 100 | 1,150 | 63.5 |
| 170 | 110 | 1,150 | 65.3 |
| 190 | 120 | 1,150 | 67.6 |
| 210 | 130 | 1,150 | 68.9 |
| 210 | 130 | 1,150 | 69.8 |
| 210 | 130 | 830 | 60.8 |
| 210 | 130 | 512 | 42.3 |
| 210 | 130 | 195 | 23.0 |

This sample had a Knoop hardness of 14.2.

When the sample was completely unloaded and removed from the blocks it was undeformed to any visible degree.

It will be apparent from the above tables that a limited deformation of the polymers herein contemplated is possible by heating the polymer to 50° C. or above. Optimum results are generally secured at 70 to 115° C. Excessively high temperatures are usually undesirable since the polymers become brittle. Accordingly, it is desirable to use temperatures below 200° C. and preferably below 150° C.

The degree of permissible deformation before fracturing occurs is dependent to a great extent upon the thickness of the polymer and the degree of cure. It may be varied by variation of the amount of soluble or fusible solid component within the polymer. Often, completely cured polymers are shaped only with difficulty and for most purposes it is considered essential to utilize a polymer containing a small fusible component.

This may be varied by variation in degree of polymerization, whereby about 1 to 15 percent or more of the polymer remains acetone soluble. Excess concentrations of such fusible component are undesirable and in most cases polymers derived by polymerization in the presence of 1 to 3 percent benzoyl peroxide are suitable. The permissible deformation may also be controlled by incorporation of liquid or fusible solid plasticizers such as halogenated naphthalene, diethylene glycol bis (butyl carbonate), dibutyl phthalate, halogenated diphenyl, or polymerized methyl methacrylate, vinyl acetate, vinylidene chloride, vinyl chloride, styrene, etc. The stress required to deform or shape these polymers of high insolubility (generally 85 to 90 percent acetone insolubility or above) is dependent upon the degree of deformation to be obtained. Obviously, the stress should not be so great as to cause the polymer to break during bending. Generally, the stress per unit area should not appreciably exceed and preferably should be below the elastic limit of the polymer.

The invention is particularly directed to the esters of unsaturated alcohols containing up to 5 carbon atoms, preferably containing the polymerizable group CH₂=C=. Thus, the invention is directed to esters of allyl, methallyl, isopropenyl, vinyl, 2-chloroallyl, butadienyl, ethylallyl, dimethylallyl, crotyl, propargyl, or methylpropargyl alcohols, ethyl vinyl carbinol, or methyl vinyl carbinol. It may also be applied to esters of other alcohols containing up to 10 carbons such as vinyl, cinnamyl, phenylpropargyl, and linallyl alcohols.

The term "polyacid" as used herein is intended to include any compound containing two esterifiable acid groups. Thus, the term includes the simple polycarboxylic acids such as oxalic, phthalic, succinic, maleic, fumaric, itaconic, silicic, titanic, phosphoric, stannic, or sulphuric acids. In addition, the term also includes the more complex acids (which may be designated as "poly-acidic esters") wherein at least one and preferably not more than six ester linkages are present between a pair of acid groups. Many of these acids do not exist in the free state but esters thereof do exist. Thus, the term includes the compounds glycolyl acid malonate,

HOOC—CH₂—O—C—CH₂COOH ethylene bis (acid phthalate)

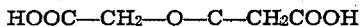

ethylene bis (acid carbonate)

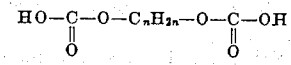

or the compound

HOOC—CH₂—O—C—O—CH₂—COOH
              ‖
              O etc.

Thus, the process may be used in the treatment of polymers of diallyl phthalate, diallyl maleate, allyl ethyl maleate, allyl oleyl maleate, allyl stearyl maleate, allyl auryl fumarate, vinyl allyl succinate, diallyl succinate, diallyl adipate, tetrallyl silicate, tetrallyl stannate, tetrallyl titanate, or the corresponding esters of other unsaturated alcohols.

Moreover, the compounds, ethylene glycol bis (allyl carbonate), triethylene glycol bis (allyl carbonate), tetraethylene glycol bis (allyl carbonate), propylene glycol bis (allyl carbonate), ethylene glycol bis (allyl phthalate), diethylene glycol bis (allyl phthalate), or other polyester of (a) a simple polyhydric compound and (b) an acid ester of a simple polybasic acid and an unsaturated alcohol may be used for this purpose. Many of such esters may be regarded as unsaturated alcohol esters of the theoretical polyacid

HO—C—O—CₙH₂ₙ—O—C—OH
   ‖               ‖
   O               O where n is a small whole number.

Esters prepared by the reaction of unsaturated esters of hydroxy carboxylic acids such as allyl lactate, allyl glycolate, allyl hydroxy butyrate, allyl ricinoleate, or allyl salicylate, with phosgene, phthalyl chloride, succinyl chloride, allyl chloroformate, etc., in the presence of an alkali as described in the above-mentioned application may be treated in accordance with the present invention. Thus, phosgene may be reacted with vinyl or allyl lactate or salicylate, etc., to form the compound

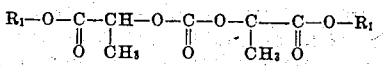

where R₁ is unsaturated which is capable of effective use when polymerized. Such a compound may be regarded as an ester of the polyacid

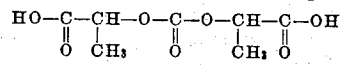

In addition, allyl or other unsaturated chloroformate may be reacted with an unsaturated ester of an hydroxy acid such as vinyl or allyl lactate to form an unsaturated ester of the polyacid

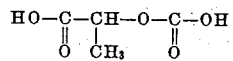

or polyhydric alcohol esters such as glycol dilactate may be treated with unsaturated chloroformate to form unsaturated esters of the polyacid.

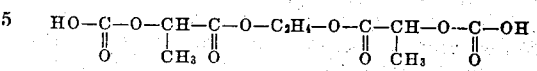

In like manner, the sulphate, phthalate, maleate, succinate, adipate, etc., corresponding to the above carbonates may be prepared and used under this invention. These esters of polyacids are described and claimed in copending applications for Letters Patent Serial No. 361,280, filed October 15, 1940, Serial No. 365,102, filed November 9, 1940, Serial No. 392,103, filed May 6, 1941, and Serial No. 403,703, filed July 23, 1941, by Irving E. Muskrat and Franklin Strain.

The compounds are generally polymerized by heat and/or light, usually in the presence of a percompound or peroxide, or other catalyst. Where a catalyst is used, the temperature at which the above esters are polymerized is dependent largely upon the percompound used as catalyst. Generally speaking, the esters are polymerized at a temperature at which the percompound slowly decomposes but below that at which the percentage rate of decomposition of the total amount of percompound in the ester exceeds the percentage rate of polymerization of the ester. Thus, when the ester is 70 percent polymerized, it may still contain at least 30 percent of the percompound initially added thereto.

Where benzoyl peroxide, lauroyl peroxide, or diacetyl peroxide is used as a catalyst, temperatures of 60 to 90° C. during the initial period of polymerization are suitable. After polymerization has proceeded to a substantial degree, for example, until the polymer has become approximately 75 percent insoluble, this temperature increased to higher temperatures, for example, 100 to 110° C. in order to secure a substantially completely polymerized product. Using ketone peroxides such as acetone peroxide, the temperature of polymerization is preferably 125° C. or above. Usually one percent or more of the peroxide is suitable for this polymerization.

The polymers to be shaped in accordance with this invention are polymerized until they are capable of retaining a form which may be imparted thereto. Generally, they are polymerized in the form of flat or curved sheets having a suitable thickness, for example, 0.10 to 0.5 inch or more. These polymers are largely insoluble, usually containing at least 85–90 percent of polymer which is insoluble in a solvent for the corresponding soluble polymer thereof and are often regarded as substantially infusible. While thermoplastic polymers such as polymerized methyl methacrylate or vinyl acetate flow or melt upon heating, these materials do not exhibit this characteristic. On the contrary, they become brittle and fracture readily but do not melt at atmospheric pressure. Usually they have been polymerized until polymerization is at least 90 percent complete. The degree of polymerization may be ascertained by determination of the percentage insolubility as previously noted or by comparison of the specific volume of the polymer with that of the monomer and of the completely polymerized polymer.

The temperature utilized in the shaping of these self-sustaining polymers is dependent upon the nature of the polymer and the degree of curvature required. Generally, this temperature should be above 50° C. and not substantially in excess of 200° C. Many of these polymers are brittle when heated to an excessively high temperature and fracture during the shaping operation. On the other hand, if the temperature is insufficient the polymer will not retain its shape. The optimum temperature for shaping any polymer may be determined by a few preliminary tests. Generally this optimum will be found to be within the range of about 70 to 130° C.

The curved or deformed polymer when finally released after heating, forming, and cooling as hereinbefore described, may recover a small portion (5 to 10 percent) of the deformation when the deforming load is released after cooling the polymer. Consequently, the shaped polymer may not conform exactly to that of the forming mold. Thus, where a shaped polymer of reasonably exact curvature is desired, it may be desirable to impart a sharper curvature to the sheet than is ultimately desired in order to compensate for the small recovery which occurs upon release of the deforming load. Flat sheets may be bent into various shapes such as cylinders, parabolic sections, etc., and may be maintained in this bent state simply by cooling the bent or curved sheets before releasing the bending load. Likewise, curved castings prepared by cast polymerizing in curved molds may be given a greater curvature by this process. The curved sheets thus secured retain their shape more or less indefinitely. However, the sheets exhibit the existence of strains when examined under polarized light and if heated return completely or nearly so to their initial shape unless prevented from so doing.

The following examples are illustrative:

Example I

A mold was prepared by clamping a pair of tempered glass sheets 18 inches square together face-to-face by means of C clamps located along the edges of the mold, using a flexible gasket of "Koroseal," a plasticized polyvinyl chloride, approximately one-eighth inch in thickness and one-half inch in width as a separator located between the sheets and adjacent the edges thereof. The mold thus formed was mounted vertically upon one corner thereof.

A quantity of partially polymerized diethylene glycol bis (allyl carbonate) was prepared by heating a composition containing the monomeric ester and 3 percent by weight of benzoyl peroxide until the viscosity increased 500 percent. The mold was filled with this thickened monomer and allowed to stand until air bubbles had risen to the upper corner of the mold and escaped. Thereafter, the mold was heated at 70° C. for 72 hours while maintaining the polymer under moderate pressure by periodically tightening the clamps moderately, a hard, transparent sheet being secured. This polymer possessed a hardness of about 15 Knoop. The polymer was heated to a temperature of 100° C. and pressed to the contour of a cylindrical segment. Thereupon the curved sheet was cooled to room temperature and removed from the mold.

Example II

A quantity of diethylene glycol bis (allyl carbonate) containing 3 percent benzoyl peroxide was placed in a mold as described in Example I and heated according to the following schedule:

1 hour at 74° C.
2 hours at 78° C.
1.75 hours at 82° C.
1.25 hours at 86° C.
0.5 hour at 90° C.
0.25 hour at 93° C.
0.25 hour at 95° C.
0.25 hour at 97° C.
0.25 hour at 100° C.

Thereupon the polymer was removed from the mold and heated for 2 hours at 116° C. The hot polymer was removed from the oven and shaped between two flannel surfaced curved molds to form a sheet having a curved contour.

Example III

A mold prepared as described in Example I was filled with diallyl phthalate containing 5 percent benzoyl peroxide and heated at 70° C. for 48 hours. Thereafter the polymer was cooled and removed from the mold. It was then heated to 165° C. and bent to form a segment of a cylinder having a radius of curvature of 8 inches and cooled to room temperature in its bent form. The polymer was clear and hard and possessed the curved form imparted thereto.

Example IV

A mold prepared as described in Example I was filled with ethylene glycol bis (allyl carbonate) containing 3 percent benzoyl peroxide and heated at 70° C. for 72 hours. Thereupon, the polymer was removed from the mold, heated to 125° C. and bent to a radius of curvature of 9 inches. The bent polymer was cooled to 25° C. before releasing the deforming force.

Example V

A mold prepared as in Example I having the internal dimensions 6 inches by 6 inches by one-eighth inch was filled with diallyl succinate containing 3 percent benzoyl peroxide. The mold was heated at 70° C. for 48 hours. Thereupon, the polymer was removed, heated to a temperature of 140° C. and bent to form a curved polymer having a radius of curvature of 8 inches. The curved polymer was cooled to 25° C. before releasing the deforming force.

*Example VI*

The process of Example III was repeated using 3 percent benzoyl peroxide and heating at 70° C. for 48 hours. The polymer thus obtained was shaped.

Although the present invention has been described and claimed with reference to the specific details of certain embodiments thereof, it is not intended that such details shall be regarded as limitations upon the scope of the invention except insofar as included in the accompanying claims.

I claim:

1. A method of preparing a shaped sheet of a hard polymer of a polyester having a least two unsaturated groups derived by the esterification of a monohydroxy alcohol which has an unsaturated linkage in a straight carbon chain, said unsaturation being attached to the second carbon atom from the hydroxy group, which method comprises heating a sheet of polymer of said ester which contains at least 85 percent of an acetone insoluble polymer to a temperature above 50° C., bending said sheet without exceeding its elastic limit while maintaining the temperature above 50° C. and cooling said polymer.

2. A method of preparing a shaped sheet of a hard polymer of a diester having two unsaturated groups derived by esterification of a monohydroxy alcohol which has an unsaturated linkage in a straight carbon chain, said unsaturation being attached to the second carbon atom from the hydroxy group, which method comprises cast polymerizing the liquid ester to form a sheet of said ester containing 90 to 99 percent acetone insoluble polymer, heating the sheet to a temperature between 70° C. and 150° C., bending said sheet without exceeding its elastic limit while maintaining the temperature above 70° C. and cooling the polymer to a temperature below 35° C.

3. The method of claim 1 in which the polyester is an allyl ester.

4. The method of claim 2 in which the diester is a diallyl ester.

5. The method of claim 1 in which the polyester is a methallyl ester.

6. The method of claim 2 in which the diester is a dimethallyl ester.

7. The method of claim 1 in which the polyester is diallyl phthalate.

8. The method of claim 2 in which the polyester is diallyl phthalate.

IRVING E. MUSKAT.